United States Patent [19]
Bjalme et al.

[11] 3,710,428
[45] Jan. 16, 1973

[54] PLASTIC PIPE FLARING TOOL

[75] Inventors: Bengt G. Bjalme; Robert E. Buhl, both of Erie, Pa.

[73] Assignee: Reed Manufacturing Company, Erie, Pa.

[22] Filed: June 9, 1971

[21] Appl. No.: 151,502

Related U.S. Application Data

[63] Continuation of Ser. No. 837,413, June 30, 1969, abandoned.

[52] U.S. Cl. ......................................29/237, 29/263
[51] Int. Cl. ...............................................B23p 19/04
[58] Field of Search .......29/200 B, 523, 237, 243.52, 29/263; 18/19 TE; 425/392, 393

[56] References Cited

UNITED STATES PATENTS

| | | |
|---|---|---|
| 3,557,434 | 1/1971 | Delahunty..............................29/237 |
| 3,345,730 | 10/1967 | Laverty..............................29/523 X |
| 1,871,616 | 8/1932 | Kerr.......................................29/237 |
| 1,639,173 | 8/1927 | Fountain et al....................29/237 X |

*Primary Examiner*—Andrew R. Juhasz
*Assistant Examiner*—Leon Gilden
*Attorney*—Ralph Hammar

[57] ABSTRACT

Thermo plastic pipe or tubing is flared into the outer member or nut of a flare fitting of the type in which the flare is interlocked with an annular recess of greater diameter than the threads. The flaring is accomplished by first assembling the nut on the pipe and then assembling on the pipe a spinning tool locally contacting the pipe end to be flared and rotated and axially advanced about the axis of the pipe. As the tool is rotated, the plastic is locally deformed both axially and radially and at the end of the flaring operation is squeezed into the annular recess so that the nut is permanently attached to the pipe by the flare.

10 Claims, 9 Drawing Figures

PATENTED JAN 16 1973   3,710,428
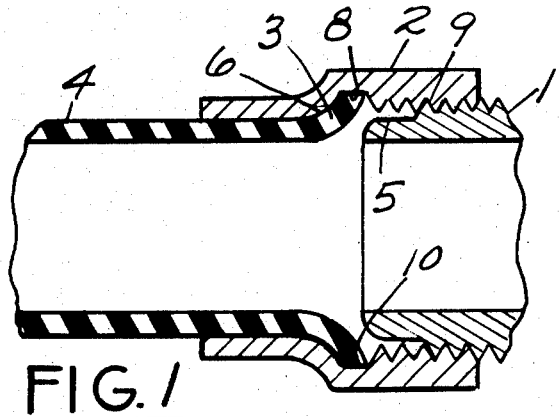
FIG. 1
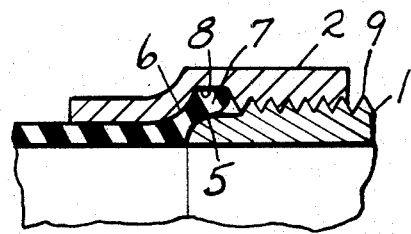
FIG. 2
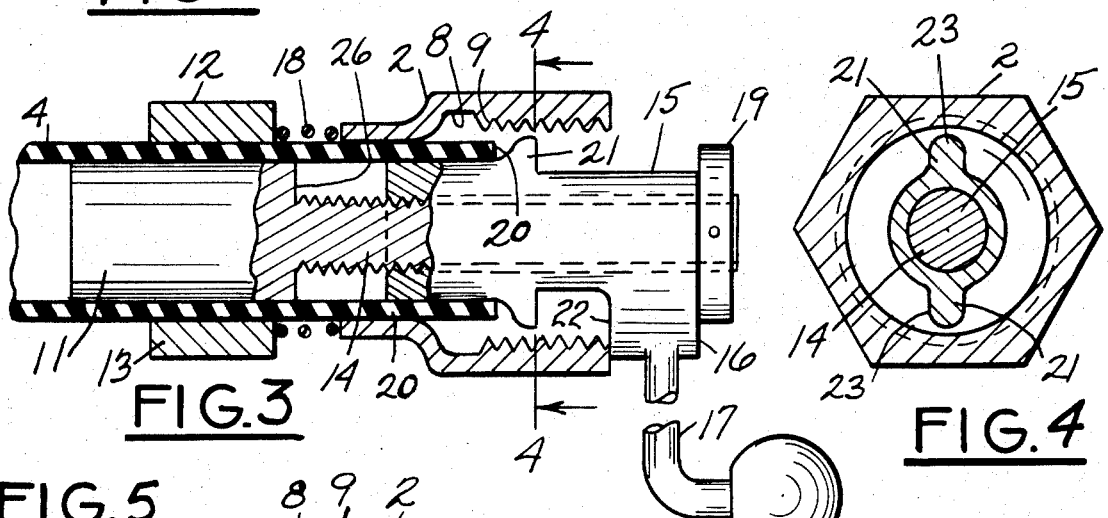
FIG. 3
FIG. 4
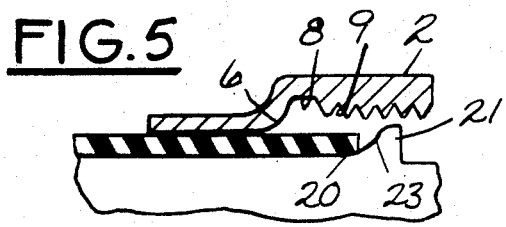
FIG. 5
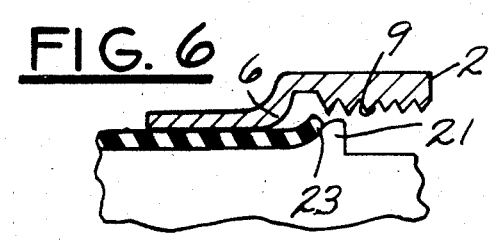
FIG. 6
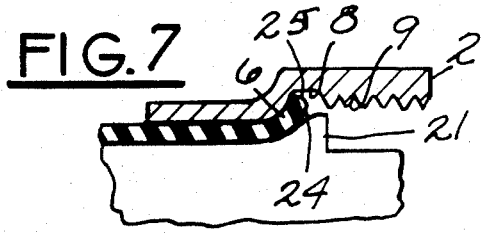
FIG. 7
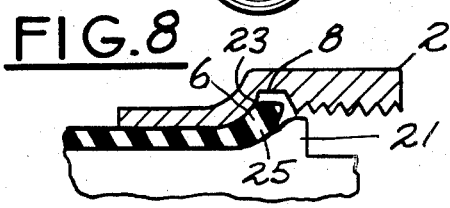
FIG. 8
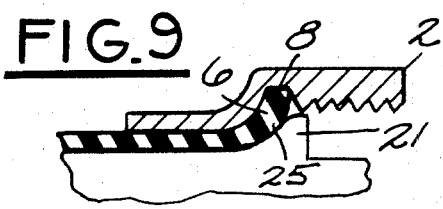
FIG. 9
INVENTOR
Bengt G. Bjalme
Robert E. Buhl
BY Ralph Hammar
ATTORNEY

PLASTIC PIPE FLARING TOOL

This application is a continuation of Ser. No. 837,413, filed June 30, 1969, now abandoned.

This invention is intended to flare thermo plastic pipe or tubing into the outer member or nut of a flare type fitting which has an annular recess of greater diameter than the threads for receiving the flare. The flare is formed while the nut is in place on the pipe so that at the end of the flaring operation the nut is assembled on the pipe.

In the drawing,

FIG. 1 is a longitudinal section through a fitting on a flared pipe end prior to tightening, FIG. 2 is a fragmentary section after tightening the FIG. 1 fitting, FIG. 3 is a longitudinal section through the tool for forming the flare, FIG. 4 is a section on line 4—4 of FIG. 3 and FIGS. 5-9 inclusive are fragmentary sections showing successive stages in the forming of the flare.

In the drawing, the flare fitting comprises inner and outer members 1 and 2 which are screwed together to capture a flare 3 on a pipe 4 of thermo plastic such as rigid polyvinyl, polyethylene, polybutylene, etc. The inner and outer members have opposed convex sealing surfaces 5 and 6 which, as the fitting is tightened, engage the mid portion of the flare 3 and squeeze the outer portion of the flare into a bead 7 filling a re-entrant groove 8 in front of sealing surface 6 and of greater diameter than the root diameter of the threads 9 on the outer member or nut 2. The bead 7 forms a positive lock which increases substantially the pull out strength of the flare. While this type of fitting has desirable strength characteristics, it has the disadvantage that the flare must be formed in the particular nut or outer member 2 with which it is to be used since the rim 10 of the flare is so much larger than the inside diameter of the threads 9 that the flare cannot be formed outside the nut and then assembled into the nut. Heretofore, the flaring operation has had to be performed by hot flaring devices where the plastic is heated above its softening point. In accordance with the structure to be described, the flare is formed by a cold flaring operation which is much quicker and simpler than the previously known hot flaring.

The tool for cold flaring the pipe end has an arbor 11 which is slidably received in the end of a pipe to be flared and is rigidly held in place by clamping jaws 12, 13 which may, for example, be similar to those in application Ser. No. 796,518, incorporated by reference. When the jaws are clamped, the intervening wall of the pipe is rigidly fixed. The arbor has an integral screw threaded extension 14 on which is screwed the hub 15 of the flaring tool. The extension 14 supports the hub and also serves as a feed screw. Prior to insertion of the arbor 11 in the pipe end, the outer member or nut 2 of the fitting is assembled on the pipe end. After the jaws 12, 13 are clamped on the pipe, the nut 2 is trapped between the jaws 12, 13 and a projection 16 receiving a crank arm 17 by which the hub is turned. A spring 18 may be arranged between the jaws and the nut to urge the nut away from the jaws. The spring is not necessary.

At the start of the flaring operation, the hub is rotated to move it against a stop 19 fixed to the projection 14 for the purpose of positioning the hub of the flaring tool so as to make a flare of the proper dimensions. In this position the free end 20 of the pipe is stopped against one or more circumferentially spaced spinning projections 21 which clear the threads 9 on the nut 2 and the inner end of the hub 15 is telescoped within and has a running clearance with and supports the free end of the pipe. A single projection may be used.

The surfaces of projection 21 which contact and form the pipe end into a flare are contoured to exert both radial and axial pressure. As the tool is rotated about and advanced along the axis of the pipe, the outer end of the pipe is locally flexed, causing heating of the plastic by internal friction which overcomes its memory and causes the plastic to take a permanent set as described further in application Ser. No. 828,260, filed May 27, 1969, incorporated by reference. FIGS. 5-9 inclusive show successive stages in the tube flaring operation. At the start of the flaring operation shown in FIG. 5, the pipe end 20 to be flared extends past a few of the threads 9 on the nut 2 and stops against the projection 21 which is received within the bore of the nut. The initial contact between the pipe end 20 and the projection 21 occurs at surface 23 which is rounded when viewed in a plane at right angles to the axis of the pipe and concave and generally complementary to the surface 6 when viewed in a plane including the axis of the pipe. The effect of the surface 23 is to flow the pipe end 20 both radially outward and axially inward as shown in the second stage of the forming operation in FIG. 6. The inner end of the hub 15 telescoped within the pipe end prevents inward movement of the plastic. The rim of the pipe end is locally stretched by engagement with the surface or surfaces 23. The concave shape of the surfaces 23 provides progressive increase in the flaring action. For the first few turns of the handle 17, the nut 2 is held lightly against a stop 22 on the hub 15 either manually or by spring 18. After the first few turns of the handle, the rim 24 enters the groove 8 as shown in FIG. 7. The nut 2 is now released and allowed to move freely during the succeeding rotation of the tool during which additional material from the pipe end is moved into the flare. Upon continued advance of the tool as shown in FIGS. 8 and 9, the flare 25 is conformed to the groove 8. At the end of the flaring operation as shown in FIG. 9, the inner end of hub 15 is stopped against shoulder 26 and the flare 25 of plastic has been bulged still further outward so as to substantially fill the groove 8 in the nut. In one size of tool for one inch plastic pipe, two turns were required for reaching the FIG. 7 stage where the flared section had entered the groove 8 and 7¼ turns were required to complete the flaring operation. These figures are by way of example and not of limitation. Upon backing the tool off to return it to the starting position, the section 25 forms a completed flare which has its maximum outside diameter greater than the inside diameter of the threads 9 so that the nut is anchored on the pipe end by the interlocking engagement of the flare 25 with the groove 8. There is some spring back of the flare but not enough to clear the threads 9. The nut is free to turn or swivel on the pipe.

In the use of the tool, the hub 15 is unscrewed to its starting position against stop 19, the nut 2 is assembled on the pipe end, the arbor 11 is inserted in the pipe until the outer end stops against projection 21, the jaws 12, 13 are clamped against the section of pipe opposite the arbor, the nut 2 is held lightly against the stop 22, and the hub is rotated by crank 17 to advance the projection 21 into the nut and form the flare. When the hub 15 stops against shoulder 26, the rotation is reversed to return the hub to stop 19 and the jaws 12, 13 are unclamped to permit removal of the tool.

What is claimed is:

1. For use in flaring a pipe end of thermo plastic pipe for a flare fitting of the type having inner and outer members, the outer member having a bore receiving the inner member of the fitting and having a flare engaging sealing surface with a re-entrant annular groove in front of the sealing surface for receiving the rim of the flare and holding the outer member assembled on the pipe, a tool comprising
   1. means for holding the pipe with the pipe end to be flared within the bore of the outer member in front of the groove and for withstanding axial thrust on the pipe end in the direction to move said pipe end relative to the fitting toward said groove,
   2. a flaring head having a surface having a running clearance with said bore and making local contact with a portion of the circumference of the pipe end to be flared,
   3. means for effecting relative rotation of the pipe end and flaring head about the axis of the pipe,
   4. means for effecting relative axial movement of the pipe end and flaring head along the axis of the pipe, the amount of said axial movement per revolution of the flaring head being a fraction of that required for a completed flare whereby the combination of said rotation and axial movement causes said surface of the flaring tool to make local contact with successive portions of the circumference of the pipe end and to locally flex the plastic causing heating of the plastic by internal friction and to cause progressive deformation or flaring of the pipe end both axially and radially into the groove and causing the displaced portion of the pipe end to take a permanent set and to remain in said groove after the flaring tool is removed.

2. The tool of claim 1 in which the means for holding the pipe comprises an arbor received in the bore of the pipe and an external clamp engaging the outer surface of the pipe and clamping the intermediate wall of the pipe against the arbor.

3. The tool of claim 1 in which the means for holding the pipe comprises an arbor received in the bore of the pipe and the flaring head is guided on the arbor.

4. The tool of claim 3 in which the arbor has a screw threaded projection and the flaring head has a hub screwed on said projection.

5. The tool of claim 1 having means for initially positioning the outer member with the groove in position to receive the rim of the flare as initially formed, the outer member being free to move axially to accommodate additional plastic displaced into the groove as the tool is further rotated about and moved axially into the pipe end.

6. The tool of claim 1 in which the surface of the flaring head when viewed in longitudinal cross section including the axis of the pipe is concave with the angle of inclination decreasing radially outward from the bore of the pipe.

7. The tool of claim 1 in which the flaring head is convex in circumferential cross section and concave in radial cross section in a plane including the axis of the pipe.

8. The tool of claim 1 in which the flaring head has an associated projection entering the bore of the pipe end and preventing inward deformation of the pipe end.

9. The tool of claim 1 in which the flaring head has a hub with its inner end projecting into and having a running clearance with the pipe end to prevent inward deformation of the pipe as the flare is formed.

10. The tool of claim 5 having spring means between said holding means and said outer member yielding under axial force to permit axial movement of the outer member by force exerted by the displaced portion of the pipe end on said groove.

* * * * *